(12) United States Patent
Palese et al.

(10) Patent No.: US 7,173,956 B2
(45) Date of Patent: Feb. 6, 2007

(54) ELECTRICALLY CONTROLLED UNIFORM OR GRADED REFLECTIVITY ELECTRO-OPTIC MIRROR

(75) Inventors: Steven P. Palese, Torrance, CA (US); Hagop Injeyan, Glendale, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 238 days.

(21) Appl. No.: 10/365,155

(22) Filed: Feb. 12, 2003

(65) Prior Publication Data

US 2004/0156415 A1  Aug. 12, 2004

(51) Int. Cl.
*H01S 3/08* (2006.01)

(52) U.S. Cl. ............... 372/99; 372/99; 372/98; 372/92

(58) Field of Classification Search ............ 372/43–50, 372/108, 99, 105, 160, 98, 26, 12, 27, 106
See application file for complete search history.

(56) References Cited

U.S. PATENT DOCUMENTS

| | | | | |
|---|---|---|---|---|
| 3,437,399 | A | * | 4/1969 | Eden .................... 359/251 |
| 3,533,015 | A | * | 10/1970 | Wuerker ................. 372/24 |
| 3,552,859 | A | * | 1/1971 | Snyder ................... 356/364 |
| 3,560,094 | A | * | 2/1971 | Del Carlo et al. ...... 356/365 |
| 3,577,097 | A | | 5/1971 | Hilberg |
| 3,615,123 | A | * | 10/1971 | Wuerker et al. ......... 359/24 |
| 3,663,087 | A | * | 5/1972 | Guillet et al. ........... 350/150 |
| 3,670,263 | A | | 6/1972 | Kantorski et al. |
| 3,675,125 | A | * | 7/1972 | Jaeclin ................... 324/96 |
| 3,694,769 | A | * | 9/1972 | Hook et al. ............. 372/12 |
| 4,305,046 | A | * | 12/1981 | Le Floch et al. ....... 331/94.5 |
| 4,575,849 | A | | 3/1986 | Chun |
| 4,629,323 | A | * | 12/1986 | Matsumoto ............. 356/365 |
| H868 | H | | 1/1991 | Daly |
| 5,029,273 | A | | 7/1991 | Jaeger |
| 5,066,112 | A | | 11/1991 | Lynam et al. |
| 5,260,964 | A | | 11/1993 | Morin et al. |

(Continued)

FOREIGN PATENT DOCUMENTS

EP       0 599 181 A      6/1994

(Continued)

OTHER PUBLICATIONS

"Solid-State Laser Engineering" by Walt Koechner, 2nd edition p. 201.

(Continued)

*Primary Examiner*—Armando Rodriguez
*Assistant Examiner*—Delma R. Flores-Ruiz
(74) *Attorney, Agent, or Firm*—Katten Muchin Rosenman LLP; John S. Paniaguas

(57) ABSTRACT

An electrically controlled variable reflectance mirror that includes a Pockels cell which enables its retardation or birefringence to be controlled in order to vary the light outcoupled from a laser cavity. Since the retardation is a function of the voltage applied to the Pockels cell, the voltage can be used to control the fraction of the output beam that is outcoupled from the laser cavity. The Pockels cell is formed with a constant reflectivity profile to form an electrically controlled uniform reflectivity electro-optic mirror. In an alternate embodiment of the invention, the Pockels cell is configured with spatially varying retardation to form an electrically controlled graded reflectivity electro-optic mirror. Both embodiments of the invention enable a lasing system, such as a solid state lasing system, to be operated over a relatively wide range of operating parameters utilizing a single set of optics.

18 Claims, 5 Drawing Sheets

U.S. PATENT DOCUMENTS

| | | | |
|---|---|---|---|
| 5,272,713 A * | 12/1993 | Sobey et al. ............... 372/69 |
| 5,299,220 A | 3/1994 | Brown et al. |
| 5,317,585 A | 5/1994 | Gregor |
| 5,351,251 A | 9/1994 | Hodgson |
| 5,384,798 A * | 1/1995 | Zucker et al. ............... 372/26 |
| 5,394,415 A * | 2/1995 | Zucker et al. ............... 372/26 |
| 5,416,620 A | 5/1995 | Osugi |
| 5,555,254 A | 9/1996 | Injeyan et al. |
| 5,646,773 A | 7/1997 | Injeyan et al. |
| 5,808,778 A | 9/1998 | Bauer et al. |
| 5,812,321 A | 9/1998 | Schierbeek et al. |
| 5,828,446 A * | 10/1998 | Davis ...................... 356/124 |
| 5,952,818 A * | 9/1999 | Zhang et al. ............... 324/96 |
| 6,028,870 A | 2/2000 | Deutsch et al. |
| 6,041,071 A | 3/2000 | Tayebati |
| 6,094,297 A | 7/2000 | Injeyan et al. |
| 6,127,817 A | 10/2000 | Chartrefou |
| 6,178,040 B1 | 1/2001 | Injeyan et al. |
| 6,208,677 B1 | 3/2001 | Moyer |
| 6,285,182 B1 * | 9/2001 | Blake et al. ................ 324/96 |
| 6,529,540 B1 * | 3/2003 | Demmer et al. ............. 372/92 |
| 6,580,732 B1 * | 6/2003 | Guch, Jr. et al. ............ 372/18 |
| 6,630,408 B1 * | 10/2003 | Tzu et al. ................... 438/717 |
| 2004/0041083 A1 | 3/2004 | Kadogawa et al. |

FOREIGN PATENT DOCUMENTS

| | | |
|---|---|---|
| EP | 1 180 834 A | 2/2002 |
| FR | 2 440 134 A | 5/1980 |
| WO | WO 00/42465 A | 7/2000 |

OTHER PUBLICATIONS

"Solid-State Laser Engineering" by Walt Koechner, 2nd edition p. 239.
"Lasers" by Siegman, p. 913.
"Lasers" by Siegman, p. 921.
Patent Abstracts of Japan, vol. 004, No. 189 (E-039), Dec. 25, 1980 & JP 55 130191 A (tech res & Dec Inst. of Japan Def Agency), Oct. 8, 1980.

* cited by examiner

ELECTRICALLY CONTROLLED UNIFORM OR GRADED REFLECTIVITY ELECTRO-OPTIC MIRROR

BACKGROUND OF THE INVENTION

1. Field of the Invention

The present invention relates to an electrically controlled variable reflectance mirror and more particularly to an electrically controlled variable reflectance mirror formed with either a constant or graded reflectivity profile, suitable for use as an outcoupling mirror, for examples for use in a solid state lasing system, which enables the output of the lasing system to be controlled electronically and thus remotely to enable the solid state lasing system to be used in a relatively wide range of operating conditions with a single set of optics.

2. Description of the Prior Art

Solid state lasing systems are generally known in the art. Examples of such solid state lasing systems are disclosed in commonly-owned U.S. Pat. Nos. 5,555,254; 5,646,773; 6,094,297 and 6,178,040, hereby incorporated by reference. Such solid state lasing systems normally include an elongated slab of a solid state lasing material, for example, a rare earth doped yttrium-aluminum-garnet (YAG) crystal and one or more diode arrays for exciting the solid state lasing material to a relatively high metastable state. Exemplary diode arrays for pumping such solid state lasing systems are disclosed in U.S. Pat. Nos. 5,317,585; 5,351,251 and commonly-owned U.S. Pat. No. 6,208,677. Such solid state lasing systems also include a total reflectivity resonator mirror and an outcoupling mirror.

Various configurations of outcoupling mirrors and optical systems are known for outcoupling light from a lasing cavity. For example, variable reflective mirror systems are known to be formed from a static waveplate and a polarizer, as disclosed in "Solid State Laser Engineering", by Walter Koechner, $2^{nd}$ Edition, published by Springer-Verlag, page 201, copyright 1988. Such variable reflectance mirrors are also known to be formed from static birefringence elements and a polarizer as disclosed in "Solid State Engineering" by Walter Koechner, $2^{nd}$ edition, published by Springer-Verlag, page 239, copyright 1988 and "Lasers", by Siegman, published by University Science Books, page 921, copyright 1986. Such variable reflectivity mirrors are also discussed in detail in "Lasers" by Siegman, published by University Science Books, pages 913–922, copyright 1986 and U.S. Pat. Nos. 4,575,849; 5,260,964; 5,299,220 and 5,260,964.

U.S. Pat. No. 5,75,849 discloses a spatially varying optical filter which includes a spatially varying static birefringence element and a polarizer. U.S. Pat. No. 5,260,964 discloses a static graded reflectivity mirror formed from a partial reflector configured such that the reflectivity varies gradually as a function of the position on the mirror surface. U.S. Pat. No. 5,299,220 discloses a use of a one-dimensional static graded reflectivity mirror.

There is a trend toward multi-functioned solid state lasers that can operate over a relatively wide range of parameters, such as repetition rate, pulse energy and power. In known solid state lasing systems that are pumped by diode arrays, these parameters are typically varied by changing the way the lasing system is pumped. However, in order to optimize the performance of the lasing system, the outcoupling mirror system needs to be tailored to the gain corresponding to the specified parameters. Such static outcoupling mirror systems are unsuitable for easy systems that operate over a relatively wide range.

In order to meet this trend, both mechanical and electrically operated outcoupling mirror systems have been developed. For example, mechanical systems are known which include a static birefringence element and a polarizer in which the reflectance is varied by rotating the birefringence element. "Solid State Laser Engineering", by Walter Koechner, $2^{nd}$ Edition, published by Singer-Verlag, FIG. 5.28, page 201, copyright 1988. Such systems are costly and inefficient and require relatively precise alignment.

Electrically operated mirrors have been developed, used primarily in the automotive industry, to provide automatic reflectance control of rearview and side view mirrors as a function of ambient light intensity. Examples of such electrically controlled mirrors, also known as electrochromic mirrors, are disclosed in U.S. Pat. Nos. 5,066,112; 5,808,778 and 5,812,321. Unfortunately, such mirrors are unsuitable for use in lasing systems.

U.S. Pat. No. 6,041,071 ('071') discloses a variable reflectance mirror that is controlled electrically to enable the wavelength of a semiconductor laser system to be controlled externally. The electrically controlled variable reflectance mirror disclosed in the '071 patent is formed from a ferro-electric electro-optical substrate and a distributed Bragg reflector. An external voltage applied to the ferro-electric electro-optical substrate controls the strain and thus the characteristics of the distributed Bragg reflector to enable the wavelength of the output beams passing through the outcoupling mirror to be electrically controlled. Unfortunately, such a system is not suitable for electrically controlling other characteristics, such as the output power of a lasing system. Accordingly, there is a need for an outcoupling mirror system whose reflectivity can be electrically controlled to enable a lasing system to be used with different operating conditions with a single set of optics.

SUMMARY OF THE INVENTION

Briefly, the present invention relates to an electrically controlled variable reflectance mirror. The electrically controlled variable reflectance mirror includes a Pockels cell which enables the light outcoupled from a laser cavity to be controlled by controlling the retardation or birefringence. Since the retardation is a function of the voltage applied to the Pockels cell, the voltage can be used to control the fraction of the output beam that is outcoupled from the laser cavity. In one embodiment of the invention, the Pockels cell is formed with a constant reflectivity profile to form an electrically controlled uniform reflectivity electro-optic mirror. In an alternate embodiment of the invention, the Pockels cell is configured with spatially varying retardation to form an electrically controlled graded reflectivity electro-optic mirror. Both embodiments of the invention enable a lasing system, such as a solid state lasing system, to be operated over a relatively wide range of operating parameters utilizing a single set of optics.

DESCRIPTION OF THE DRAWINGS

These an other advantages of the present invention will be readily understood with reference to the following specification and attached drawing wherein.

DETAILED DESCRIPTION

Figure 1A:
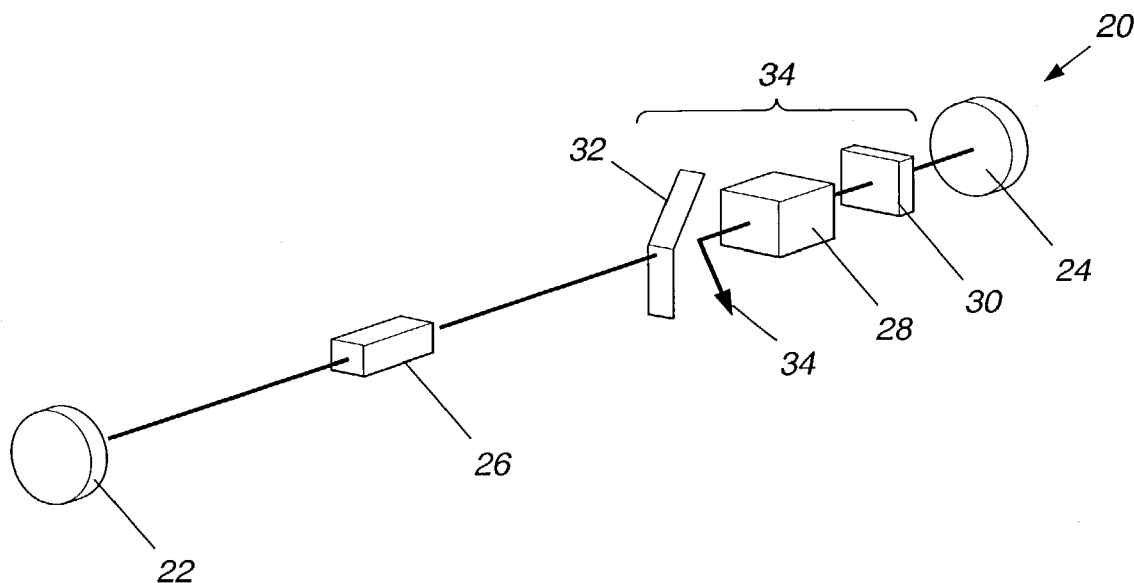
FIG. 1A is a perspective view of a electrically controlled variable reflectance mirror in accordance with the present invention.
Figure 1B:
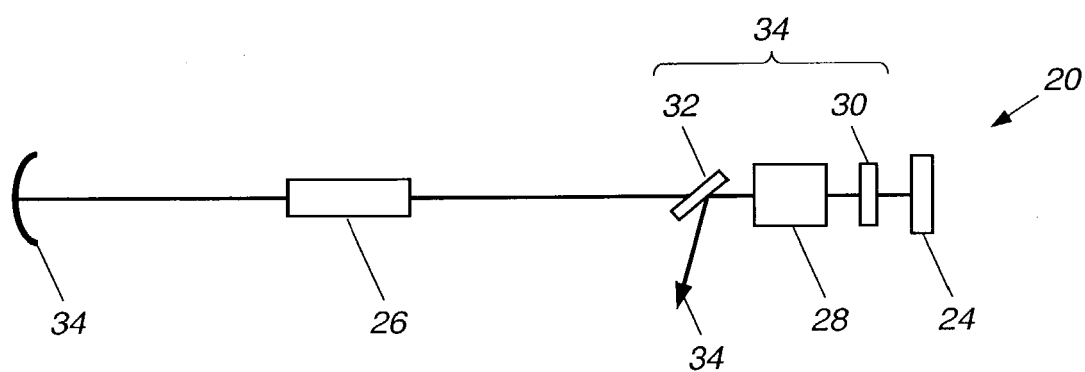
FIG. 1B is a top view of the electrically controlled variable reflectance mirror illustrated in FIG. 1A.

The present invention relates to an electrically controlled variable reflectance mirror system for use as an outcoupling mirror, for example, in solid state lasing systems, to enable such solid state lasing systems to operate over a relatively wide range of parameters utilizing a single set of optics. In one embodiment of the invention, an electrically controlled uniform reflectivity electro-optic mirror as illustrated in FIGS. 1A and 1B, incorporates a standard Pockels cell. Such standard Pockels cells are extremely well known in the art and are disclosed in, for example, U.S. Pat. Nos. 5,029,273; 5,416,620; 6,127,817 and U.S. Statutory Invention Registration H868.

Figure 2A:
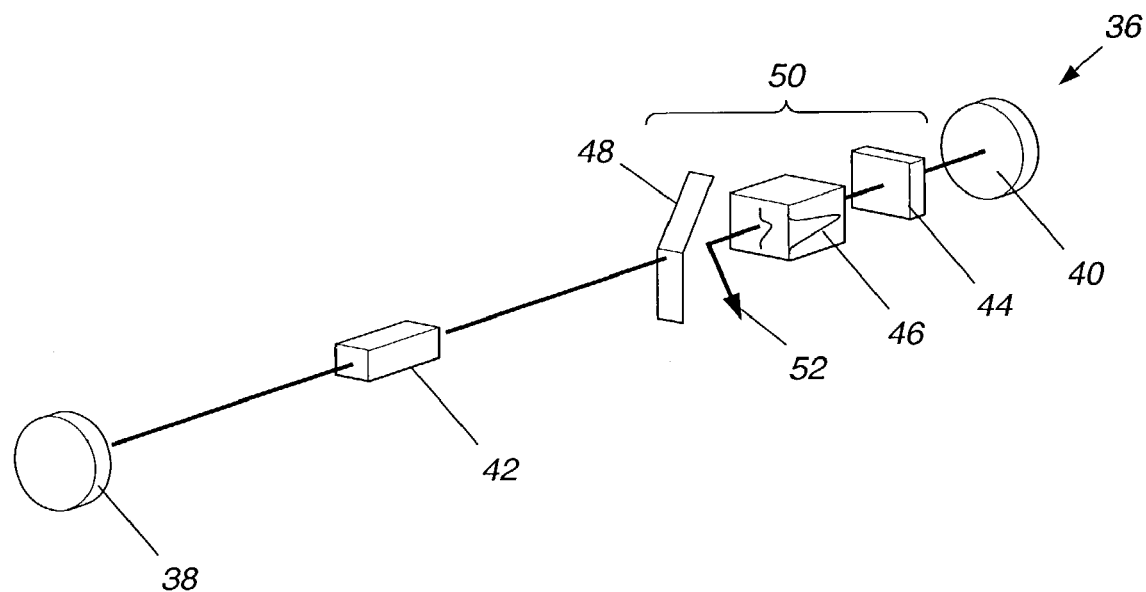
FIG. 2A is a perspective view of an electrically controlled graded reflectivity mirror in accordance with the present invention.
Figure 2B:
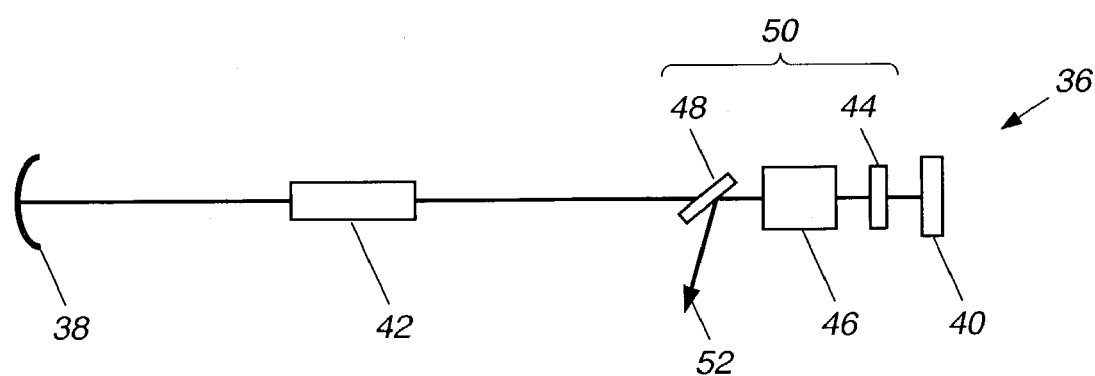
FIG. 2B is a top view of the electrically controlled reflectivity mirror illustrated in FIG. 2A.
Figure 3:
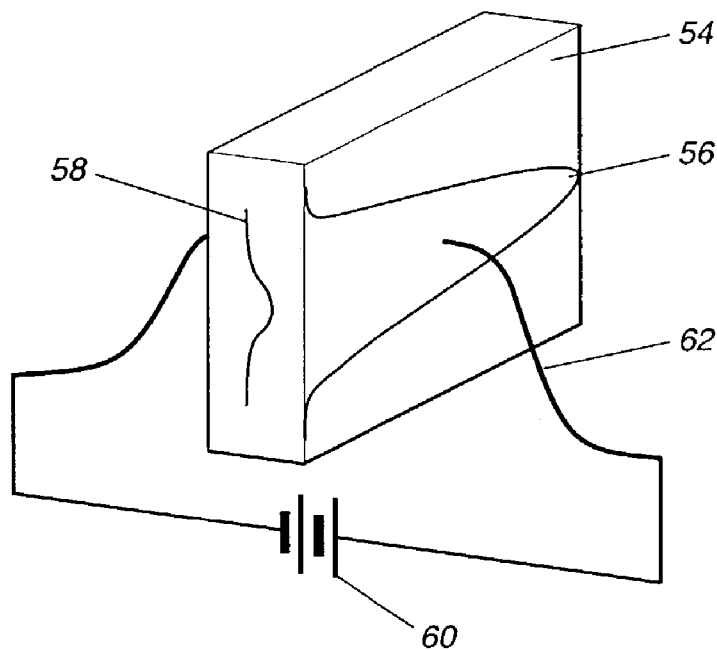
FIG. 3 is a perspective view of one embodiment of a Pockels cell formed with spatially varying retardation for use with the electrically controlled graded reflectivity mirror illustrated in FIGS. 2A and 2B.
Figure 4:
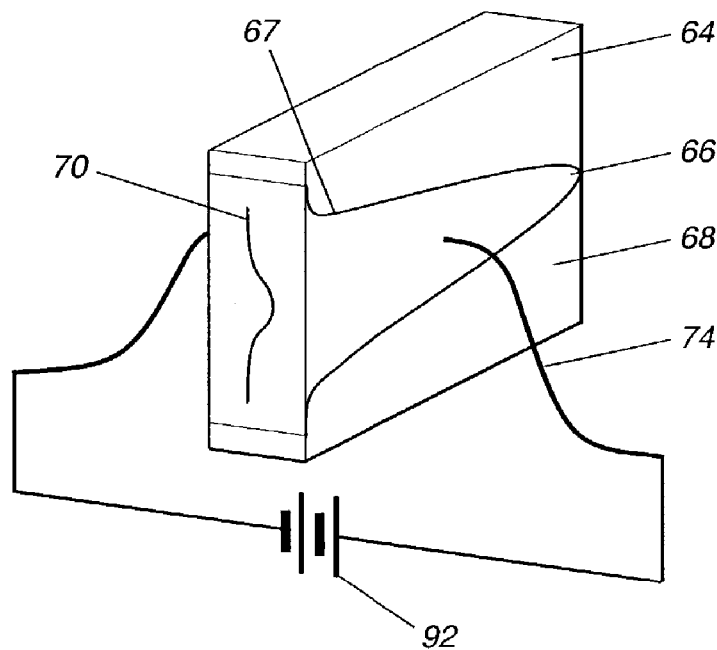
FIG. 4 is a perspective view of an alternate embodiment of the Pockels cell illustrated in FIG. 3 for use with the electrically controlled graded reflectivity mirror illustrated in FIGS. 2A and 2B.
Figure 5:
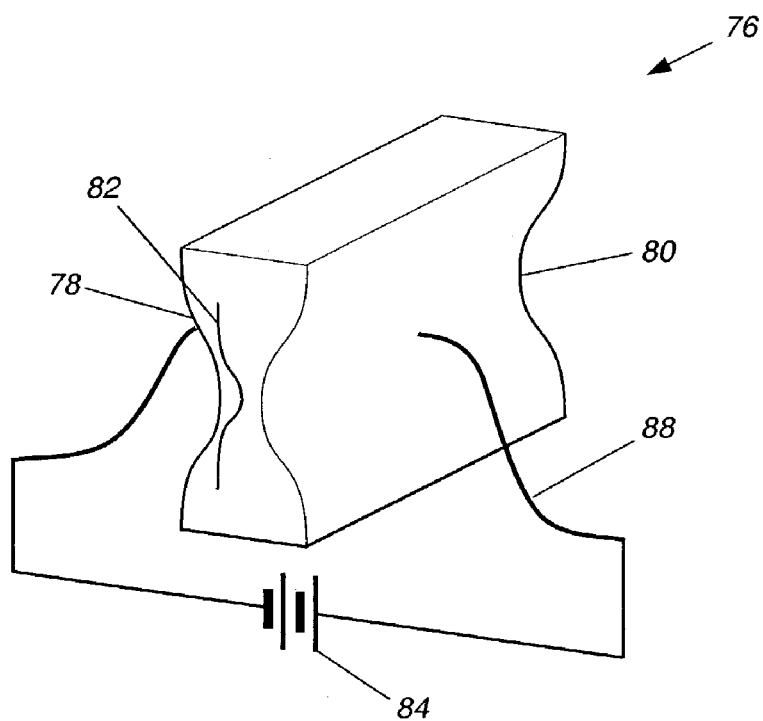
FIG. 5 is a perspective view of another alternate embodiment Pockels cell illustrated in FIG. 3 for use with the electrically controlled graded reflectivity mirror illustrated in FIGS. 2A and 2B.

FIGS. 2A and 2B illustrate an alternate embodiment of the invention for an electrically controlled graded reflectivity electro-optic mirror. The electrically controlled graded reflectivity electro-optic mirror illustrated in FIGS. 2A and 2B utilizes custom Pockels cell as illustrated in FIGS. 3–5.

Figure 6:
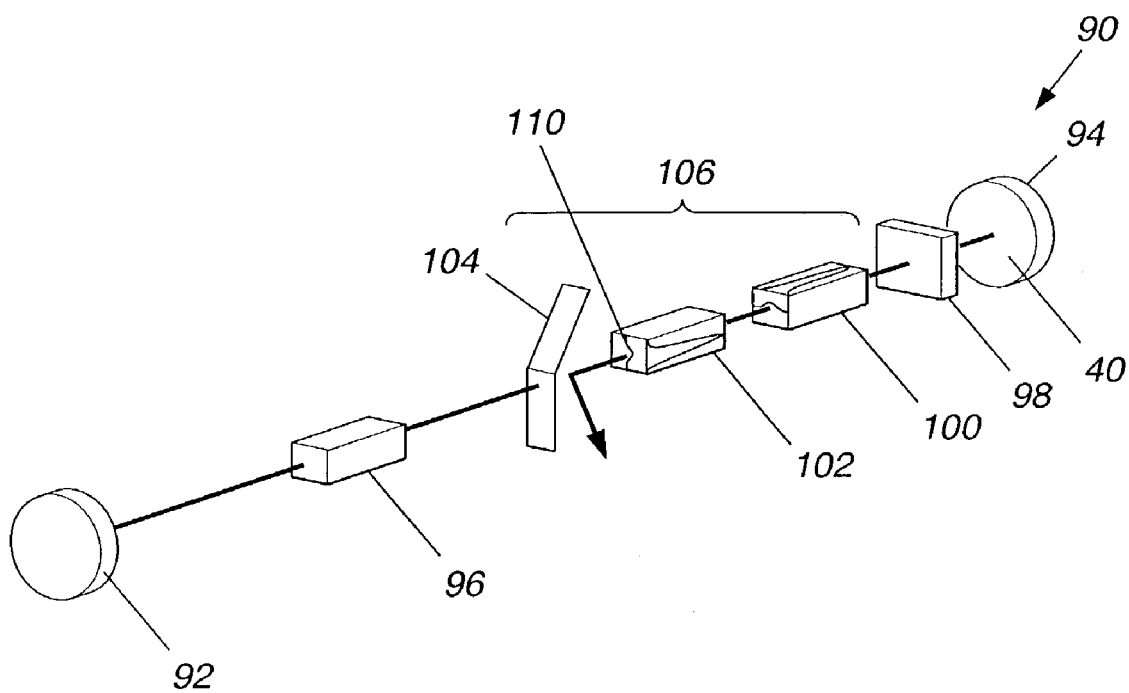
FIG. 6 is perspective view of a two-dimensional electrically controlled graded reflectivity mirror formed from two orthogonal Pockels cells in accordance with another aspect of the invention.
Figure 7:
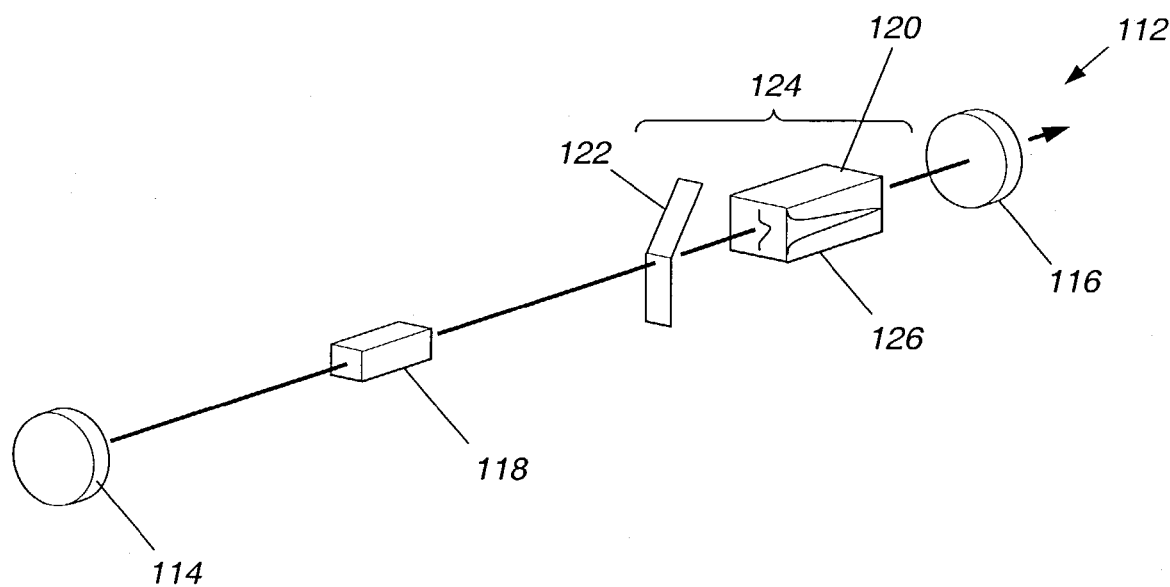
FIG. 7 is perspective view of an electrically controlled spatial filter in accordance with another aspect of the invention.
Figure 8:
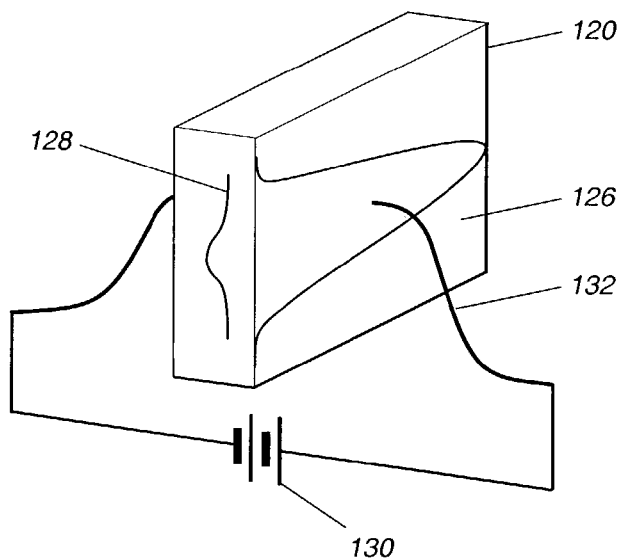
FIG. 8 is a perspective view of a Pockels cell for use in the electrically controlled spatial filter illustrated in FIG. 7.

FIG. 6 illustrates another alternate embodiment of a two dimensional electrically controlled graded reflectivity mirror formed from two orthogonal Pockels cells. FIG. 7 relates to yet another alternate embodiment of the invention and in particular to an electrically controlled spatial filter which utilizes a Pockels cell as illustrated in FIG. 8. All of the embodiments of the invention rely on controlling the retardation or birefringence of a Pockels cell to outcouple light from a laser cavity. Since the retardation is function of the voltage applied to Pockels cells, the voltage can be used to control the outcoupling fraction.

Turning to the FIGS. 1A and 1B, an electrically controlled variable reflectance mirror in accordance with one aspect of the invention is illustrated. The electrically controlled variable reflectance mirror is illustrated in a solid state lasing system, generally identified with the reference numeral 20, and includes a totally reflecting mirror 22, which, as illustrated in FIG. 1B, is typically curved. The solid state lasing system 20 also includes another total reflecting mirror 24. In this application, the total reflecting mirror 24, for example, a flat mirror, replaces the outcoupling mirror normally used in such solid state lasing systems. A gain medium 26 is disposed between the mirrors 22 and 24 which defines a lasing cavity. The gain medium 26 may be, for example, a YAG crystal pumped by a diode array (not shown) as discussed above.

The outcoupling mirror system in accordance with one aspect of the invention is formed from a standard Pockels cell 28, a λ/4 waveplate 30 and a polarizer 32, for example, a dielectric polarizer. The outcoupled beam is identified with the arrow 34.

As is known in the art, the retardation or birefringence of a Pockels cell varies as a function of the external voltage applied to the cell. When no voltage is applied to the Pockels cell 30, it acts as a passive element. In this mode, the λ/4 waveplate 30 converts linear polarized light into circular polarized light and rotates the polarization by 90° after a round trip through it. The rotated beam is rejected from the laser cavity by the polarizer 32 forming the output beam 34. When a voltage is applied to the Pockels cell 30, the Pockels cell 30 becomes active and causes a retardation which partially compensates for the retardation caused by the waveplate 30 causing the beam to be elliptically polarized. The elliptically polarized beam is only partially ejected by the polarizer 32 forming a partial reflector. When the voltage on the Pockels cell 28 reaches a value that enables it to fully compensate for the waveplate 30, the rotation of the polarization caused by the waveplate 30 is fully compensated by the Pockels cell 28 which enables 100% of the beam to pass through the polarizer 32 effectively producing a total reflector. As such, the electrically controlled variable reflectance mirror formed from the standard Pockels cell 28, λ/4 waveplate 30 and polarizer 32, collectively identified with the reference numeral 34, serve as an electrically controlled outcoupler with a uniform reflectivity that can vary between 0% and 100% as the voltage is varied from zero to a voltage which enables the Pockels cell to fully compensate for the 90° rotation in the polarization caused by the λ/4 waveplate 30. This voltage is known as the λ/4 wave voltage.

FIGS. 2A and 2B illustrate an alternate embodiment of the invention, shown in a solid state laser application, which includes a electrically controlled graduated reflectance mirror for outcoupling a portion of the light beam from the laser cavity to form an output beam. In this embodiment, a Pockels cell, as illustrated in FIGS. 3–5, is used to introduce a spatially varying retardation to form an electrically controlled graduated reflectance mirror system as will be discussed in more detail below. The spatially varying retardation may be created in various ways including: shaping the electrode on a Pockels cell crystal, as generally shown in FIG. 3; shaping the Pockels cell crystal itself as shown in FIG. 4; and fabricating a composite crystal such that only a spatially varying length section of the crystal is active as illustrated in FIG. 5.

Referring to FIGS. 2A and 2B, the solid state lasing system, generally identified with the reference numeral 36, includes a totally reflecting mirror 38, which may curved as illustrated in FIG. 2B. The solid state lasing system 36 also includes another totally reflecting mirror 40, which, in this case, is curved as illustrated in FIG. 2B. In this application, the totally reflecting mirror 40 replaces the outcoupling mirror that is typically used in such an application. A gain medium 42 is disposed between the mirrors 38 and 40 and defines a lasing cavity therebetween. The electrically controlled graduated reflectivity mirror includes a λ/4 waveplate 44, a Pockels cell 46 and polarizer 48, collectively identified with the reference numeral 50. The output beam is generally identified with the arrow 52. Various embodiments of the Pockels cell 46 are contemplated for providing spatially varying retardation. The various embodiments of the Pockels cell 46 are illustrated in FIGS. 3–5.

Turning first to FIG. 3, a first embodiment of a Pockels cell for use with the electrically controlled graded reflectance mirror is illustrated in FIGS. 2A and 2B. The Pockels cell illustrated in FIG. 3 is generally identified with the reference numeral 54. In this embodiment, the spatially varying retardation is formed by shaping the electrode on the Pockels cell crystal. Although a Guassian retardation profile is shown in FIG. 3 and described, the electrode can be configured with virtually any profile. As discussed above, the retardation or birefringence of such Pockels cells rely on an external voltage applied to the electrode 56. As such, a high voltage power supply 60 is provided and coupled to the electrode 56 by way of electrical conductors 62.

Typically, such Pockels cells are formed by depositing electrodes, for example, gold electrodes, on opposing surfaces of an electro-optically active crystal, such as BBO or $LiNbO_3$. When a voltage is applied across the crystal, the crystal becomes birefringence and causes retardation. For transverse excited Pockels cells, configured such that the electric field is transverse to the direction of beam propagation, such as in BBO or $LiNbO_3$ Pockels cells, the amount of retardation is provided by equation (1) below:

$$\delta = (2\pi/\lambda) \cdot r \cdot n^3 V \cdot (l/d), \quad (1)$$

where $\delta$ is the phase retardation, $\lambda$ is the wavelength, r is the electro-optic co-efficient, n is the index of refraction, V is applied voltage, L is the length of the active section of the crystal when the field is present, and d is the crystal thickness in the direction of the applied field.

With reference to equation (1), it can be seen that if the active length of the crystal is spatially varying, the retardation will also be spatially varying. Similarly, if the crystal thickness is spatially varying, the retardation will also vary spatially. As shown in FIG. 3, the active length of the crystal is tailored by having a spatially formed electrode, for example, with a Gaussian profile, formed in the x-dimension. This results in a one-dimensional graded reflectivity mirror which has 100% transmission on the top and bottom edges and a center reflectivity that can vary from 0% to 100% by varying the applied voltage.

The geometry of the Pockels cells 34 minimizes field spreading and produces good retardation fidelity with respect to the shape of the electrode 56. The electrodes can be made into any shape useful for resonator design with proper masking, such as high order Gaussian profiles, flat tops or even Bessel functions.

The same result can be achieved by the embodiment illustrated in FIG. 4 in which only one section of the crystal is active. Referring to FIG. 4, the Pockels cell 64 includes a composite crystal formed with an electro-optically active crystal portion 66 and an electro-optically passive crystal portion 68. As shown, the electrically active portion 68 is formed with an exemplary birefringence profile. Other profiles could also be used. The electrically active crystal portion 66 can be formed by bonding for example, with optical contracting and/or diffusion bonding two sections of crystals BBO or $LiNbO_3$ together where the active portion 66 is crystallographically oriented properly and the inactive portion 68 is not. For example, the activity can be controlled by poling one section of the crystal opposite from the other. As shown, a pair of electrodes 67 are formed on the opposing sides of the active crystal portion 66. The electrodes 67 may optionally extend over the inactive portion 68.

As shown in FIG. 4, the retardation profile 70 for Pockels cell 64 is similar to the retardation profile 58 for the Pockels cell 54. In addition, the Pockels cell 64 requires a high voltage supply 72 connected to the electrodes 67 by way of a pair of high voltage connections, generally identified with reference numeral 74.

An alternate embodiment of the Pockels cell is illustrated in FIG. 5 and generally identified with the reference numeral 76. In this embodiment, the performance of the Pockels cell is controlled by shaping the width or thickness of the crystal to define a profile, for example, as illustrated with the reference numeral 78. In this embodiment, the electrodes are formed on the opposing surfaces 80 and 82 of the Pockels cell 76. A high voltage supply 84 may then be coupled to the Pockels cell 76 by way of a pair of high voltage connections, generally identified with the reference numeral 88. In this embodiment, since the shape of the crystal has a slightly less direct relationship with the strength of the electric field in the crystal, computer models may be used to define the exact crystal shape that will yield a desire spatially varying retardation profile.

FIG. 6 illustrates an alternate embodiment of the invention forming a two-dimensional electrically controlled graduated reflectance mirror. The two-dimensional electrically controlled graduated reflectance mirror is illustrated in a solid state lasing system, generally identified with the reference numeral 90. The lasing system includes a totally reflecting mirror 92, for example, a curved mirror similar to the mirror 38 illustrated in FIG. 2B. The lasing system 90 also includes another totally reflective. mirror 94 which also may be curved, similar to the mirror 40 illustrated in FIG. 2B. The mirror 94 replaces the outcoupler mirror typically used in such applications. A gain medium 96 is disposed between the mirrors 92 and 94 defining a laser cavity therebetween.

The two-dimensional electrically controlled graduated reflective mirror includes a $\lambda/4$ wave retardation plate 98 which converts linearly polarized light into circular polarization and rotates the polarization by 90° after a round trip through it. In this embodiment, a pair of Pockels cells 100 and 102 are provided, which incorporate Pockels cells, for example, as illustrated in FIGS. 3–5. The two-dimensional electrically controlled graduated reflectance mirror also includes a polarizer 104, a $\lambda/4$ waveplate 98, Pockels cells 100 and 102 and a polarizer 104, collectively identified with the reference numeral 106. The Pockels cells 100 and 102 may be formed from one of the Pockels cells illustrated in FIGS. 3–5 but oriented orthogonal relative to one another. For example, the Pockels cell 100 may be oriented so that the spatially varying retardation is in the horizontal direction while the Pockels cell 102 is oriented so that the spatially varying retardation is in a vertical direction. The retardation profiles 108 and 110 for the Pockels cells 100 and 102, respectively, in this embodiment are summed to produce a two-dimensional retardation profile. The embodiment illustrated in FIG. 6 is suited for relatively low aspect ratio beams. Computer modeling may be used to determine the shape of the electrode such that the position of the two fields produces a desired spatial profile. Because of the low aspect ratio, field spreading is preferably taken into account.

The embodiments illustrates in FIGS. 1–6 and described above are primarily intended for use in a lasing system with unstable laser cavity. FIGS. 7 and 8 illustrate an alternate embodiment of the invention in which an electrically controlled graduated reflectance mirror can be used as an electrically controlled spatial filter. As such, it can be used with a partial reflector to control the cavity mode in a stable resonator. In this embodiment, a Gaussian or higher Gaussian profile spatial filter, for example, is useful in controlling the mode of a resonator without introducing a diffractive loss. A Pockels cell is used with a retardation plate with a complementary spatial profile such that the retardation is zero at the center of the Pockels cell and increases towards the edges to 100% when λ/4 wave voltage is applied.

Referring to FIG. 7, a solid state lasing system with a stable resonator cavity is illustrated and generally identified with the reference numeral 112. The solid state lasing system 112 includes a totally reflecting mirror 114, which may be curved similar to the mirror 38 illustrated in FIG. 2B. The solid state lasing system 112 further includes a partially reflecting mirror 106 which is typically flat for stable resonator cavities. A gain medium 118 is disposed between the mirrors 114 and 116 and defines a laser cavity therebetween. The electrically controlled spatial filter includes a Pockels cell 120 and a polarizer 122. The Pockels cell 120 and polarizer 122 which form the electrically controlled spatial filter are collectively identified with the reference numeral 124. In this embodiment, the Pockels cell 120 is formed with an electrode pattern 126 that is complementary to the electrode pattern illustrated in FIG. 3, for example, an inverse Gaussian profile. The retardation profile 128 for the Pockels cell 120 is illustrated in FIG. 8. For an exemplary inverse Gaussian profile, the center (where there is no electrode) will have no retardation while the edges will have λ/4 wave retardation. A high voltage power supply 130 is connected to the Pockels cell 120 by way of a pair of high voltage electrical connections 132.

Obviously, many modification and variations of the present invention are possible in light of the above teachings. For example, thus, it is to be understood that, within the scope of the appended claims, the invention may be practiced otherwise than as specifically described above.

We claim:

1. An electrically controlled variable reflectance mirror comprising:
   a Pockels cell formed with opposing electrodes for connection to an external voltage source;
   a λ/4 plate; and
   a polarizer, wherein said Pockels cell is configured to provide uniform birefringence as said external voltage source is varied.

2. An electrically controlled variable reflectance mirror comprising:
   a Pockels cell formed with opposing electrodes for connection to an external voltage source;
   a λ/4 plate; and
   a polarizer, wherein said Pockels cell configured to provide graded birefringence as said external voltage source is varied.

3. A solid state lasing system comprising:
   a first and second totally reflecting mirror, spaced apart defining a lasing cavity therebetween;
   a gain medium disposed in said lasing cavity and
   an outcoupling mirror system for outcoupling a portion of the light from said lasing cavity defining an output beam, said out coupling mirror system including at least one Pockels cell, a quarter wave plate, a polarizer, and a variable voltage source, wherein the reflectivity the outcoupling mirror system is continuously variable as a function of the voltage applied to said Pockels cell, wherein said Pockels cell is configured to provide graded birefringence as said external voltage source is varied.

4. The solid state lasing system as recited in claim 3, wherein said Pockels cell is configured to provide uniform birefringence as said external voltage source is varied.

5. The Pockels cell as recited in claim 4, wherein said birefringence profile is a Gaussian profile.

6. A Pockels cell for providing a varying birefringence profile, the Pockels cell comprising:
   a crystal having opposing sides;
   an electrode pattern formed on said opposing sides, said Pockels cell configured to provide a birefringence profile along said opposing sides, wherein said a birefringence profile is an inverse Gaussian profile.

7. The Pockels cell as recited in claim 6, wherein said crystal is formed as a composite form an electrically inactive crystal portion and electrically active crystal portion.

8. The Pockels cells as recited in claim 7, wherein said electrically active crystal portion is configured with a predetermined birefringence profile.

9. The Pockels cells as recited in claim 7, wherein said birefringence profile is a Gaussian profile.

10. A solid state laser system comprising:
    first and second totally reflecting mirrors, spaced apart defining a lasing cavity therebetween;
    a gain medium disposed in said lasing cavity;
    an outcoupling mirror system for outcoupling a portion of light from said lasing cavity defining an output beam, said outcoupling system including a quarter wave plate, a polarizer, two Pockels cells, and a variable voltage source adapted to be electrically connected to at least one of said Pockels cells, said at least one of said Pockels cells providing a continuously variable birefringence profile as a function of the voltage applied to said at least one Pockels cell.

11. The solid state system as recited in claim 10, wherein at least one of said Pockels cells is formed with a graduated birefringence profile.

12. A solid state lasing system comprising:
    first and second totally reflecting mirrors, spaced apart defining a lasing cavity therebetween;
    a gain medium disposed in said lasing cavity;
    an outcoupling mirror system for outcoupling a portion of light from said lasing cavity defining an output beam, said outcoupling system including a quarter wave plate, a polarizer, two Pockels cells, and a variable voltage source adapted to be electrically connected to at least one of said Pockels cells, said at least one of said Pockels cells providing a continuously variable birefringence profile as a function of the voltage applied to said at least one Pockels cell, wherein the each of said Pockels cells are formed with a graduated birefringence profile.

13. A solid state lasing system comprising:
    first and second totally reflecting mirrors, spaced apart defining a lasing cavity therebetween;
    a gain medium disposed in said lasing cavity;
    an outcoupling mirror system for outcoupling a portion of light from said lasing cavity defining an output beam, said outcoupling system including a quarter wave plate, a polarizer, two Pockels cells, said Pockels cells configured with graduated birefringence profiles, wherein said Pockels cells are orientated such that said birefringence profiles are not aligned.

14. The solid state lasing system as recited in claim 13, wherein said birefringence profiles are offset by about 90°.

15. A solid state lasing system comprising:
    a totally reflecting mirror;
    a partially reflecting mirror spaced away from said totally reflecting mirror defining a laser cavity therebetween;

a gain medium disposed in said laser cavity;

an electrically controlled with a continuously variable birefringence profile spatial filter disposed within said laser cavity; and a variable voltage source, wherein the birefringence of said spatial filter is a function of the voltage applied thereto.

16. The solid state lasing system as recited in claim 15, wherein said electrically controlled spatial filter includes a polarizer and a Pockels cell.

17. A solid state lasing system comprising:

a totally reflecting mirror;

a partially reflecting mirror spaced away from said totally reflecting mirror defining a laser cavity therebetween;

a gain medium disposed in said laser cavity;

an electrically controlled with a continuously variable birefringence profile spatial filter disposed within said laser cavity; and a variable voltage source, wherein the birefringence of said spatial filter is a function of the voltage applied thereto, wherein said electrically controlled spatial filter includes a polarizer and a Pockels cell and wherein said Pockels cell is formed with a graduated birefringence profile.

18. A solid state lasing system comprising:

a totally reflecting mirror;

a partially reflecting mirror spaced away from said totally reflecting mirror defining a laser cavity therebetween;

a gain medium disposed in said laser cavity; and an electrically controlled spatial filter including a polarizer and a Pockels cell, said electrically controlled spatial filter disposed within said laser cavity, wherein said Pockels cell is formed with an inverse Gaussian profile.

* * * * *